US012042459B1

(12) United States Patent
Liu

(10) Patent No.: US 12,042,459 B1
(45) **Date of Patent: *Jul. 23, 2024**

(54) STIMULATION DEVICE UTILIZING AN AIR CYLINDER

(71) Applicant: HYTTO PTE. LTD., Singapore (SG)

(72) Inventor: Dan Liu, Guangdong (CN)

(73) Assignee: HYTTO PTE. LTD., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 18/491,232

(22) Filed: Oct. 20, 2023

Related U.S. Application Data

(63) Continuation-in-part of application No. 18/153,423, filed on Jan. 12, 2023, now Pat. No. 11,833,100.

(51) Int. Cl.
*A61H 19/00* (2006.01)
*A61H 9/00* (2006.01)

(52) U.S. Cl.
CPC ........... *A61H 19/34* (2013.01); *A61H 9/0057* (2013.01); *A61H 9/0071* (2013.01); *A61H 2201/0107* (2013.01); *A61H 2201/0111* (2013.01); *A61H 2201/1215* (2013.01); *A61H 2201/123* (2013.01); *A61H 2201/1246* (2013.01); *A61H 2201/149* (2013.01)

(58) Field of Classification Search
CPC ............ A61H 19/00–50; A61H 9/0057; A61H 9/0071; A61H 9/005; A61H 2009/0064
USPC .......................................................... 600/38
See application file for complete search history.

(56) References Cited

U.S. PATENT DOCUMENTS

| | | | | |
|---|---|---|---|---|
| 11,452,665 | B1 | 9/2022 | Yu et al. | |
| 11,833,100 | B1 * | 12/2023 | Liu | A61H 19/34 |
| 2020/0085681 | A1 | 3/2020 | Haddock et al. | |
| 2020/0214932 | A1 * | 7/2020 | Pahl | A61H 9/005 |
| 2021/0196559 | A1 * | 7/2021 | Liu | A61H 19/32 |
| 2022/0015983 | A1 | 1/2022 | Li | |
| 2022/0175612 | A1 * | 6/2022 | Witt | A61H 19/30 |
| 2022/0409470 | A1 * | 12/2022 | He | F04B 35/01 |
| 2023/0027905 | A1 * | 1/2023 | Yu | A61H 23/006 |

(Continued)

FOREIGN PATENT DOCUMENTS

KR 200390415 Y1 * 7/2005

OTHER PUBLICATIONS

Translation of KR-200390415-Y1. Accessed from Espacenet Dec. 7, 2023. (Year: 2003).*

*Primary Examiner* — Valerie L Woodward
*Assistant Examiner* — Paige Kathleen Bugg
(74) *Attorney, Agent, or Firm* — F. Chau & Associates, LLC

(57) ABSTRACT

A stimulation device includes an exterior housing including an opening. A power source is disposed within the exterior housing. A motor is disposed within the housing and the motor receives power from the power source to generate a spinning motion. A motion converter transforms the spinning portion from the motor into a reciprocating motion. An air cylinder receives the reciprocating motion from the motion converter and expands and contracts a volume of a chamber therefrom, the chamber delivering an alternating positive and negative pressure to the opening of the exterior housing as the chamber volume contracts and expands, respectively. An impermeable structure separates the air cylinder from the motor and power source, within the exterior housing.

20 Claims, 11 Drawing Sheets

A–A

(56) References Cited

U.S. PATENT DOCUMENTS

| | | | | |
|---|---|---|---|---|
| 2023/0048210 | A1 | 2/2023 | Chen | |
| 2023/0111787 | A1* | 4/2023 | Layman | A61H 9/0071 600/38 |

* cited by examiner

B-B

STIMULATION DEVICE UTILIZING AN AIR CYLINDER

CROSS REFERENCE TO RELATED APPLICATION

This application is a Continuation-in-Part of co-pending U.S. patent application Ser. No. 18/153,423, filed on Jan. 12, 2023, the entire contents of which are herein incorporated by reference.

TECHNICAL FIELD

The present disclosure relates to a sexual stimulation device and, more specifically, to a sexual stimulation device utilizing an air cylinder.

DISCUSSION OF THE RELATED ART

Various sexual stimulation devices may make use of a wide variety of mechanical means for providing a desired type of sexual stimulation to a user. For example, some devices may vibrate, some may wiggle or articulate, some may provide reciprocating motion, and still others may provide intermittent suction. Those sexual stimulating devices that are designed to provide intermittent suction may include a pressure generating chamber that is configured to reduce and enlarge its volume so as to produce intermittent suction. This pressure generating chamber may be open to the ambient environment so as to deliver the provided suction to the user as desired. Thus, this open configuration, in combination with the generation of suction, may have the potential to draw in liquid or moisture, which may be pulled up into the mechanism of the device, thereby potentially leading to corrosion and other forms of damage that may lead to malfunction.

SUMMARY

A stimulation device includes an exterior housing including an opening. A power source is disposed within the exterior housing. A motor is disposed within the housing and the motor receives power from the power source to generate a spinning motion. A motion converter transforms the spinning portion from the motor into a reciprocating motion. An air cylinder receives the reciprocating motion from the motion converter and expands and contracts a volume of a chamber therefrom, the chamber delivering an alternating positive and negative pressure to the opening of the exterior housing as the chamber volume contracts and expands, respectively. An impermeable structure separates the air cylinder from the motor and power source, within the exterior housing.

A stimulation device includes an exterior housing including an opening. A power source is disposed within the exterior housing. An electromagnetic coil is disposed within the housing and receives power from the power source to generate an intermittent magnetic field. An air cylinder is configured to expand and contract a volume of a chamber thereof by the intermittent magnetic field of the electromagnetic coil, the chamber delivering an alternating positive and negative pressure to the opening of the exterior housing as the chamber volume contracts and expands, respectively. An impermeable structure separates the air cylinder from the electromagnetic coil, within the exterior housing.

A stimulation device includes an exterior housing including an opening. A power source is disposed within the exterior housing. A motor is disposed within the housing and receives power from the power source to generate a spinning motion. A bar magnet is connected to an output shaft of the motor and is configured to spin under the spinning motion of the motor to generate a magnetic field of alternating polarity. An air cylinder is configured to expand and contract a volume of a chamber thereof in response to the alternating polarity of the spinning bar magnet, the chamber delivering an alternating positive and negative pressure to the opening of the exterior housing as the chamber volume contracts and expands, respectively. An impermeable structure separates the air cylinder from the bar magnet, motor, and power source, within the exterior housing.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
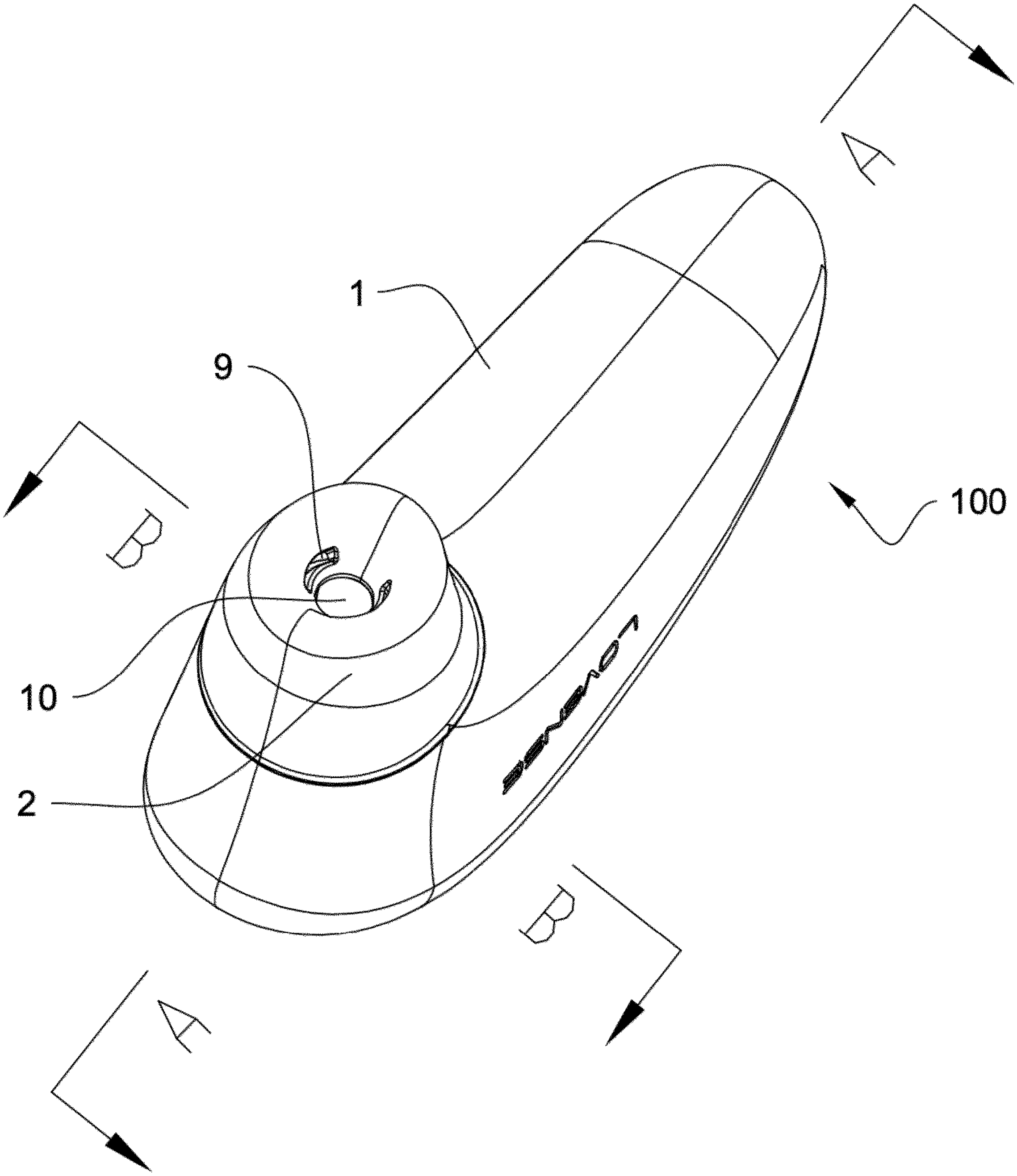
FIG. 1 is a perspective view of a stimulation device in accordance with exemplary embodiments of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

It is to be understood that the elements illustrated and described with respect to one figure may be mixed and matched with the elements illustrated and described with respect to another figure and elements that appear to look similar in one figure to elements that are described with respect to another figure may be assumed to be at least similar to those corresponding elements.

Exemplary embodiments of the present disclosure relate to a stimulation device that provides sexual stimulation to a user by the generation of intermittent pressure using an air cylinder. The air cylinder may provide desired pressure by enlarging and reducing a volume of a chamber, for example, by taking a pair of nested cylindrical bodies and extending a second cylindrical body out from a first cylindrical body, thereby increasing the combined volume, which forms the volume of the chamber, and then retracting the second cylindrical body back into the first cylindrical body, thereby reducing the volume of the chamber. Increasing the volume of the chamber creates relatively low pressure within the chamber that then creates suction at an opening of the chamber. Reducing the volume of the chamber creates relatively high pressure within the chamber that then creates a puffing at the opening of the chamber. Thus, by alternately driving the nested cylindrical bodies, the desired intermittent pressure may be generated.

However, as mentioned above, the sucking created by the low pressure of the air cylinder may be inclined to draw in liquid and moisture into the chamber and this liquid and moisture might be able to ingress in the spacing between the nested cylindrical bodies. This ingress of liquid and moisture between the nested cylindrical bodies might then expose internal elements of the stimulation device to the liquid and moisture leading to corrosion of the internal elements and/or the growth of potentially harmful mold and/or bacteria.

Conventionally, electronic devices may be made waterproof by the use of gaskets and adhesives provided between casing elements. However, as the nested cylindrical bodies must remain free to move relative to each other, and the cavity of the cylindrical bodies must remain exposed to the ambient environment in order to deliver the produced pressure, conventional waterproofing techniques might not be readily adaptable to a stimulation device utilizing an air cylinder.

Accordingly, exemplary embodiments of the present invention may utilize a malleable impermeable structure that may enclose the nested cylindrical bodies so as to block liquid or moisture that may infiltrate the space between the nested cylindrical bodies from entering a remainder of the stimulation device. In this way, sensitive internal components of the stimulation device may be protected from liquid and moisture, thereby increasing the reliability and safety of the stimulation device.

FIG. 1 is a perspective view of a stimulation device in accordance with exemplary embodiments of the present disclosure. As can be appreciated from this figure, the stimulation device 100 may have a housing 1 that forms an exterior of the device and defines an interior in which various mechanical and electronic elements are disposed. The housing 1 may be fully enclosed but for an opening 10 that is present in a top front section thereof. As the housing 1 may be comprised of multiple shell sections, these shell sections may be fixed to one another using gaskets or other traditional waterproofing means.

An air cylinder 2 may be disposed within the device 100 and the opening 10 of the housing 1 may lead directly into the air cylinder 2. One or more holes 9 may also be present in the exterior of the air cylinder 2. These holes may be used to maintain a fixed pressure within the interior of the housing 1, as will be described below in detail. The holes 9 may be sealed using a sealing plug so as to allow for the regulation of air pressure therethrough but to block the ingress of liquid or moisture. It is noted that the opening 10 might not be sealed with a sealing plug in the same manner as the holes 9 so as to provide space for sensitive parts of the user's body, such as a clitoris, to be pulled up into the opening 10 so as to enhance sexual stimulation thereof.

Figure 2:
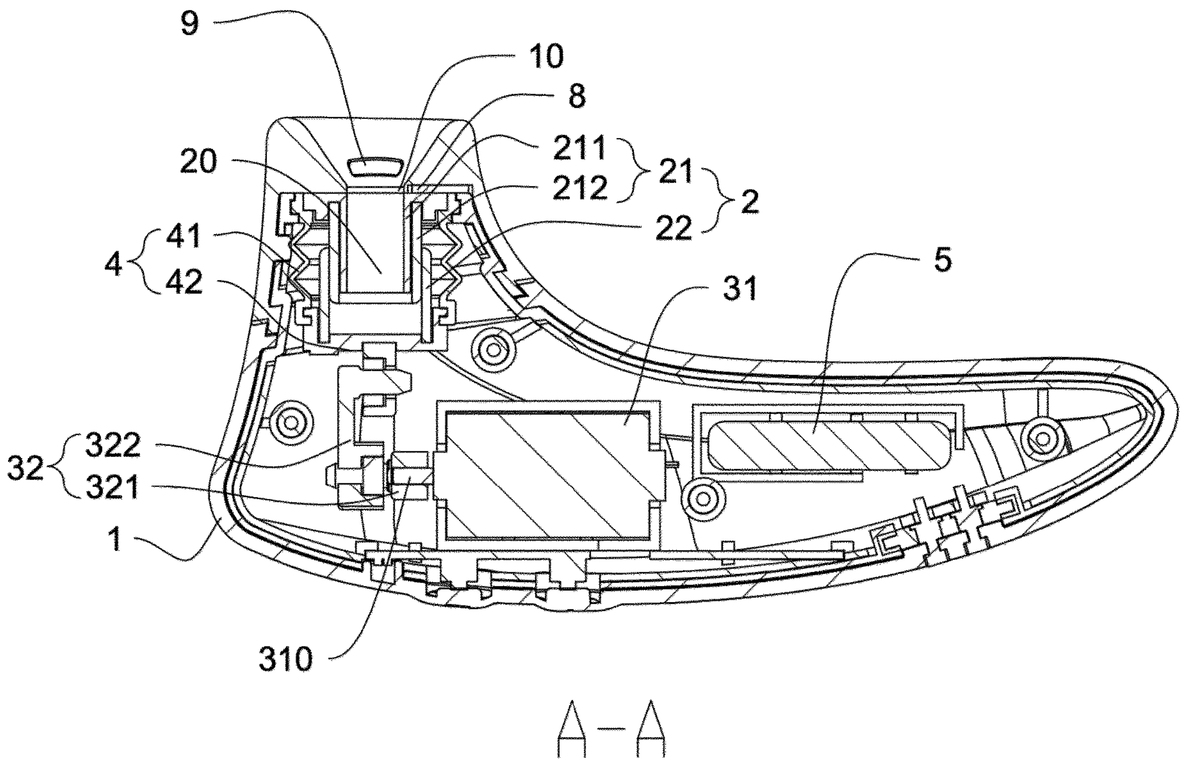
FIG. 2 is a cross-sectional view of the stimulation device of FIG. 1 shown along line A-A thereof.
Figure 3:
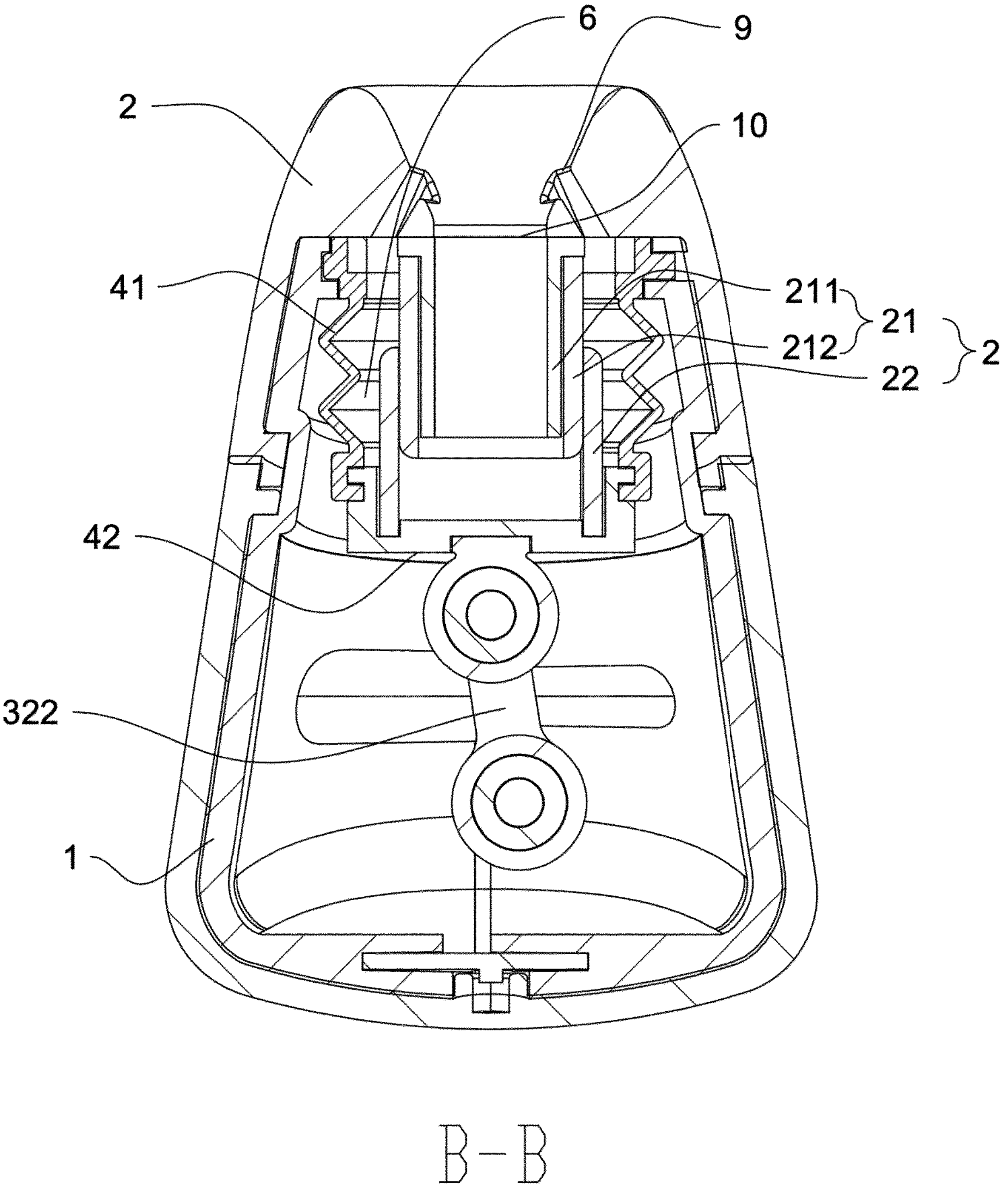
FIG. 3 is a cross-sectional view of the stimulation device of FIG. 1 shown along line B-B thereof.

The device 100 is shown as having a vertical cross-section A-A that is shown in greater detail in FIG. 2 and a horizontal cross-section B-B that is shown in greater detail in FIG. 3. Thus, FIG. 2 is a cross-sectional view of the stimulation device 100 of FIG. 1 shown along line A-A thereof. As can be seen from this figure, the air cylinder 2 includes a pair of nested cylinders, as described above. One cylinder may be a stationary sleeve 21, which remains stationary with respect to the opening 10 of the housing 1, and the other cylinder may be a motional container 22, which is free to move down, away from the stationary sleeve 21 so as to enlarge the volume of the chamber 20 and move up, towards the stationary sleeve 21 so as to reduce the volume of the chamber 20.

The stationary sleeve 21 may include a main cylinder 212 as well as a cylindrical support 211. The cylindrical support 211 may be fixed to the device 100, below the opening 10. The cylinder 212 may be inserted into the motional container 22 and may be fixed to the cylindrical support 211. The motional container 22 may be free to move against the exterior of the cylinder 212. The cylinder 212 may be made of a low-friction material such as metal while the cylindrical support 211 may be made of a material that is corrosion resistant, such as plastic. The motional container 22, or at least the lateral walls thereof, may also be made of a low-friction material such as metal so that the lateral walls of the motional container 22 may be free to slide along the outer surface of the cylinder 212.

The motional container 22 may be driven up and down by a motion converter 32 that takes rotational motion from a motor 31 and converts it into an up-and-down (reciprocating) motion. This may be accomplished, for example, by including a crank 321 and a connecting rod 322. As the motor 31 spins, the crank 321, that is rotationally connected to an output shaft 310 of the motor 31, has one side that is spun around in a circle and an opposite side that is rotationally connected to the connecting rod 322 so that the connecting rod 322 is brought down as the crank 321 reaches the low part of its circle and is brought up as the crank 321 reaches the high part of its circle. The connecting rod 322 is also connected to the motional container 22 so that as the connecting rod 322 is brought down and up, so too is the motional container 22.

The motor 31 may be powered by an internal power source 5, such as a battery, which may be replaceable and/or rechargeable. The motor 31 may be under the control of a controller module, such as an integrated circuit, which may also be disposed within the housing 1. The controller module may control the operation of the motor 31 in accordance with instructions or a predetermined program. One or more I/O elements, such as buttons, display screens, etc., may be connected to the controller module and may be accessible through the housing 1 without compromising the waterproof nature of the device 100. The battery may also be rechargeable via a port that passes through the housing 1, however, the battery may also be recharged wirelessly by induction or by the use of exposed connector pins.

One or more sensors 8 may also be disposed proximately to the opening 10. These sensors 8 may be pressure sensors, light sensors, touch sensors, etc., and may function to detect when the device 100 is held up in contact to the body of the user so as to control the motor 31 in response thereto, or to modify the provided pressure in accordance with a sensed pressure.

An impermeable structure 4 may be disposed within the housing 1, between the air cylinder 2 and the remainder of the device 100, including the housing 1. The impermeable structure 4 may include a bellows portion 41, which acts as a lateral side protector, and a bottom wall 42, which acts as a bottom of the motional container 22. The bellows portion 41 may have an accordion shape that connects the opening 10 to the bottom wall 42. This accordion shape may be configured to expand and contract as the chamber 20 of the pressure filed generator 2 operates to exhibit changes in volume. The interior of the housing 1 may provide an open internal space to accommodate the expansion and contraction of the bellows 41.

The bellows 41 may be made of a waterproof and flexible material such as a synthetic rubber or the like. The bottom wall 42 may be made of a more rigid waterproof material such as plastic so that when the connecting rod 322 pushes up and down on the bottom wall 42 the motional container 22 may be set in motion. However, the bottom wall 42 need not transfer motion from the connecting rod 322 to the motional container 22 and the connecting rod 322 may be fixed to the sidewall of the motional container 22. However, even in this case, the bottom wall 42 may still be rigid so as not to bow in response to the pressure that is created by the air cylinder 2.

In some embodiments, however, the bottom wall 42 may also be flexible and when flexible, it may be made as a single continuous element with the bellows 41. In this case, the connecting rod 322 may push up against the bottom wall 42 to deform it in shape, and push it into the motional container 22, thereby causing the motional container 22 to move. In this way, the motion may be transferred to the motional container 22 through the barrier of the impermeable structure 4.

The bellows 41 may be connected to the outer wall of the motional container 22, at a bottom portion of the bellows 41 and may be connected to the housing by the cylindrical support 211 at a top portion of the bellows 41.

The bottom wall 42 may be connected to the bellows 41 in a fluid-tight manner so as to prevent moisture and liquid from escaping at this interface. A cavity might be created between the bottom wall 42 and the bottom of the cylinder 212. Thus, as the air cylinder 2 operates to enlarge and shrink the volume of the chamber 20, high and low pressure may be generated in this cavity inversely to the pressure generated by the air cylinder 2. To relieve and balance this cavity pressure with the ambient environment, this cavity may be in communication with the aforementioned holes 9 via a space between the cylinder 212 and the motional container 22, and then though the gap 6. In this way, the holes 9 may provide an intermittent sucking and puffing so that added stimulation may be provided to the user.

The hole 9 may be connected to the aforementioned cavity by a tube or other pathway that may project downwardly within the housing 1.

FIG. 3 illustrates the presence of a gap 6 between the bellows 41 of the impermeable structure 4 and the motional container 22. This gap may be in communication with the cavity described above that exists between the motional container 22/bottom wall 42 and the underside of the cylinder 212, for example, by a small space between the stationary sleeve 21 and the motional container 22. The aforementioned hole 9 may be in communication with this gap 6 and by extension, with the aforementioned cavity. By allowing this gap 6 to pressurize with the ambient environment, the bellows 41 may more easily fold as the motional container 22 is raised, so that the bellows 41 do not puff up like a balloon within the housing 1.

Figure 4:
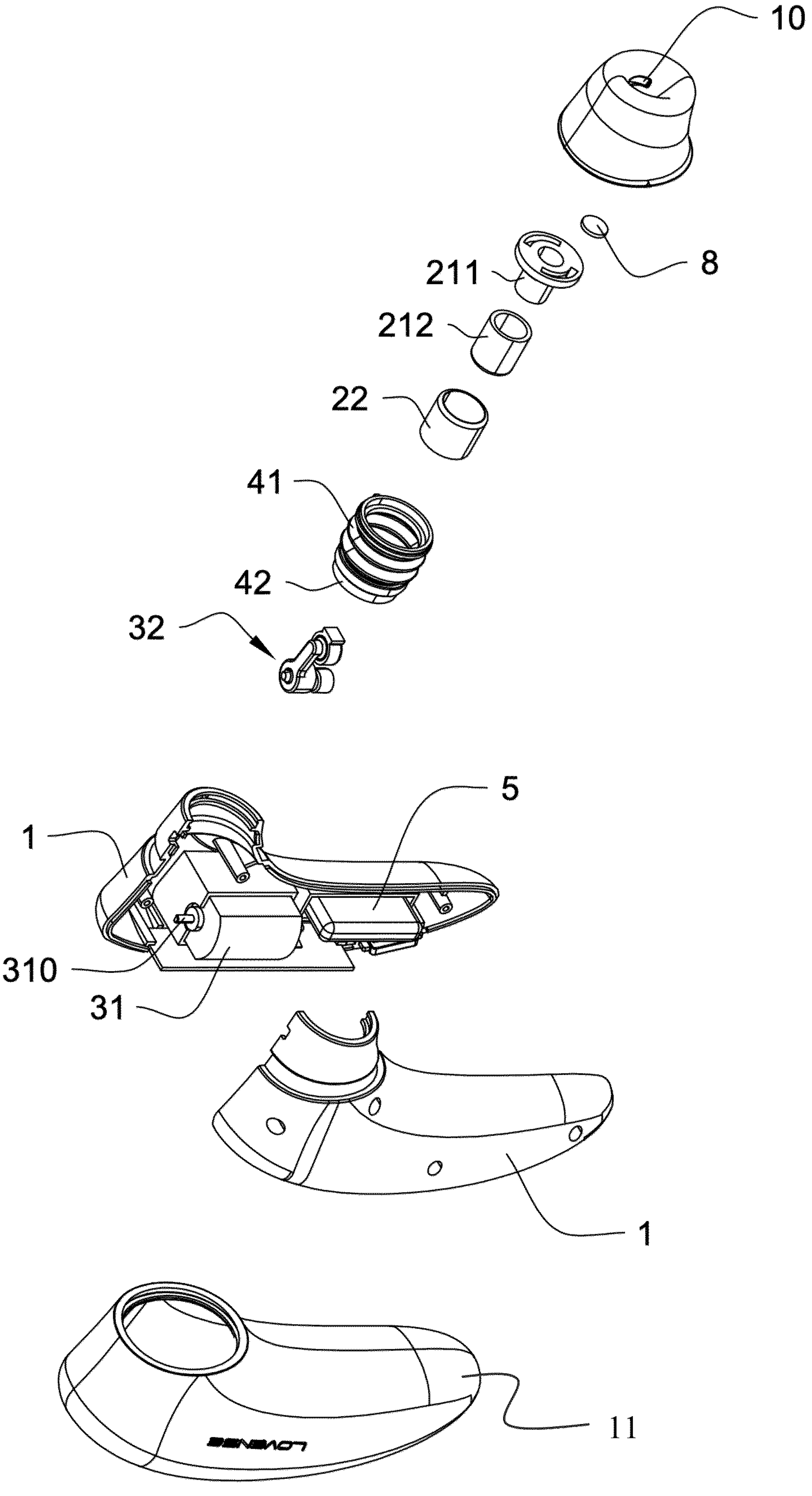
FIG. 4 is an exploded view of the stimulation device of FIG. 1.

FIG. 4 is an exploded view of the stimulation device 100 of FIG. 1. As can be seen from this figure, the opening 10 is disposed through a tip part which may also include the sensors 8. The cylindrical support 211 may have a top flange with openings that may help to pass air between the holes 9 and the gap 6. The cylinder 212 may have a cylinder shape and the motional container 22 may have a cylinder shape that has a larger diameter than that of the cylinder 212 so as to accommodate the cylinder 212 concentrically therein. The bellows 41 may similarly have a substantially cylindrical shape but with accordion side walls and a bottom wall 42 that is substantially disk shaped. The motion converter 32 may also be seen in this picture as having the rod and crank arrangement described above. The housing 1 may open into two halves, as shown, with a rubber gasket disposed therebetween to maintain fluid proofing, although this element is optional. The two sides of the housing 1 may be connected to one another by screws, with the various screw holes and posts being visible from this figure. The two sides of the housing 1, when connected to each other, may be covered by a protective skin 11, which may be silicone or another elastic impermeable material.

Figure 5:
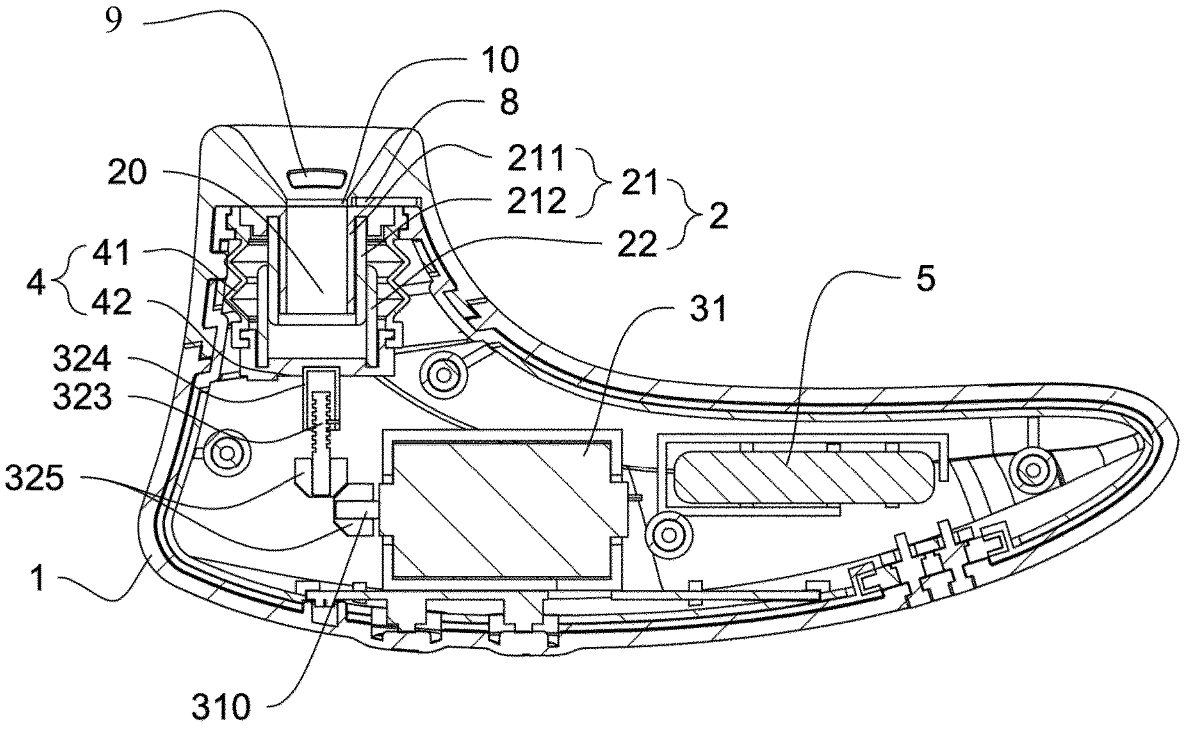
FIG. 5 is a cross-sectional view of a stimulation device including an alternative means for imparting reciprocal motion, in accordance with exemplary embodiments of the present disclosure.

The motion converter 32 need not include a connecting rod 322 and a crank 321 and may alternatively include any mechanism for imparting reciprocating motion from the rotational motion of the motor. FIG. 5 shows an example of a stimulation device 100 including an alternative means for imparting reciprocal motion.

As can be seen from this figure, the motion converter 32 may include a screw-based reciprocating mechanism having a screw 323 having a helical groove on its exterior. The screw 323 may be coupled to the output shaft 310 of the motor 31.

For example, the output shaft 310 of the motor 31 may be coupled to the screw 323 by a pair of bevel gears 325 having perpendicular rotational axes with respect to one another, so as to convert the horizontal rotational axes of the motor 31 into a vertical rotational axes so as to maintain a desired shape of the housing 1 as substantially "L" shaped.

A nut 324 may be coupled to the screw, about the groove. As the groove has a double-helical shape with the ends of each helix coming together at the top and bottom, the nut 324 may travel up and then down repeatedly (it being blocked from rotation by the interior of the housing 1) as the screw 323 turns in one direction.

The distal end of the nut 324 may be coupled to a bottom wall 42 of the impermeable structure 4 acting as a power transmission unit, such that the motional container 22 is moved up and down in a reciprocating manner by the action of the nut 324. The nut 324 reciprocates linearly with the unidirectional rotation of the screw 323.

The holes 9 need not be disposed on the interior of the casing 1 over the opening 10, as shown in FIG. 3 and discussed above. For example, FIG. 6 shows a cross-sectional view of a stimulation device having a hole 90 that is disposed on the exterior of the casing over the opening 10.

Figure 6:
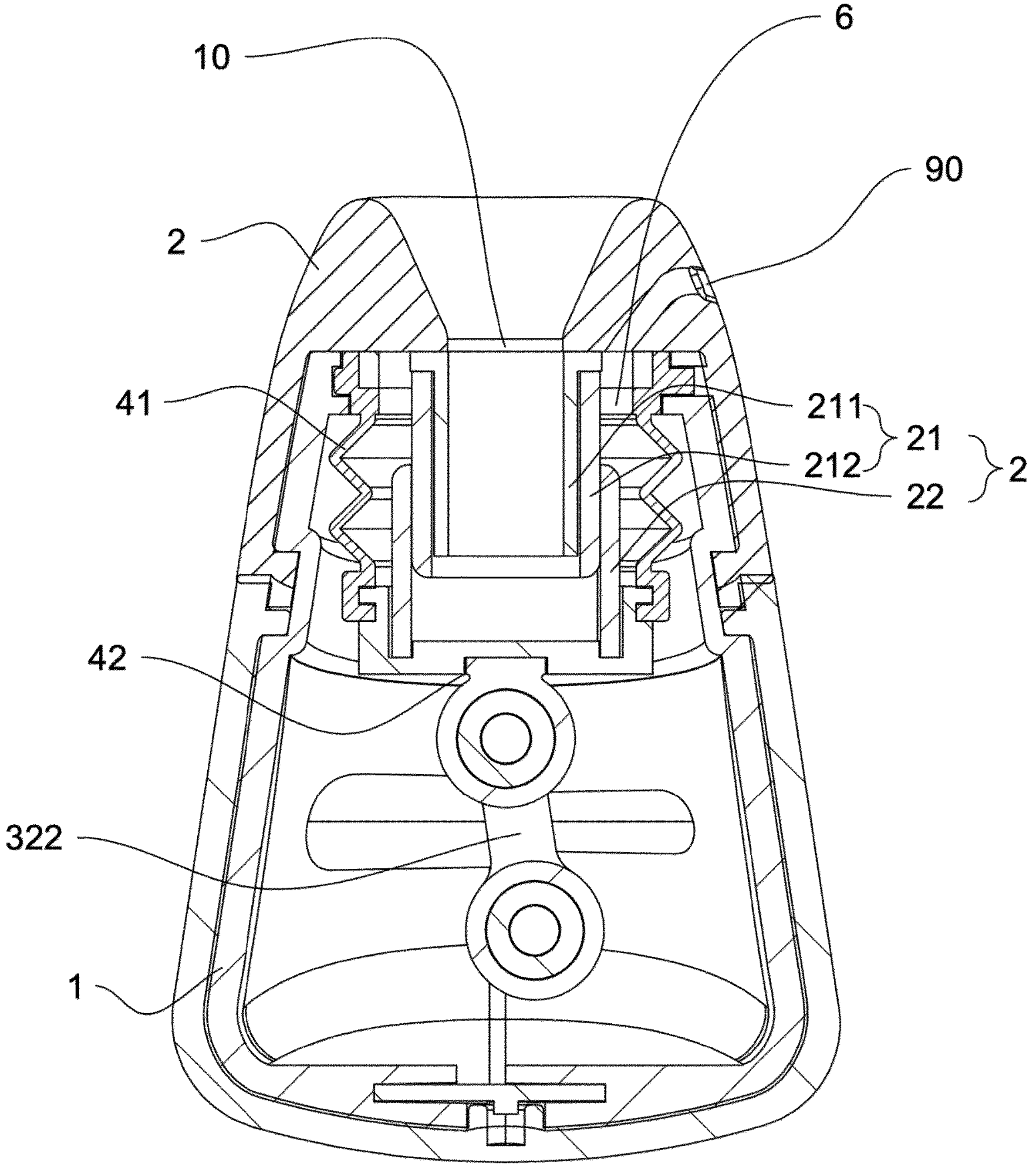
FIG. 6 is a cross-sectional view of a stimulation device having a hole that is disposed on the exterior of the casing over the opening, in accordance with exemplary embodiments of the present disclosure.

By disposing this opening on the exterior, as shown in FIG. 6, the hole 90 may be better protected from infiltration of moisture and fluid as it is less likely to come into direct contact with the user and is also less likely to be physically blocked by the user. In this arrangement, the hole 90 opens to the side rather than to the top, but the hole 90 is still in communication with the gap 6, as discussed above.

A process for cleaning the air cylinder within the bellows may make use of the hole 90. Prior to cleaning, the user may block the opening 10 with a finger and immerse the device in clean water. Then, the motor 31 may be activated, causing the bellows 41 to expand and contract. As the bellows 41 expands, water flows through holes 90, drawing water into the interior of the device and the chamber 20 through the gap 6 between the stationary sleeve 21 and the motional container 22. When the bellows 41 contracts, the water flow is discharged through hole 90 to the outside of the stimulation device. This process may effectively clean the interior of the bellows 41 and an interior of the chamber 20 of the air cylinder 2.

The stimulation device 100 has been described as having a housing that is unitary in construction. This is to say, while the housing may have two side halves, these halves have been described as joining together by screws and so the device 100 is not necessarily intended to be separated by the user. However, according to other approaches, the stimulation device 100 may be configured for easy separation and reattachment of a top section with respect to a bottom section. This separability may allow for better cleaning of the device by separating that part of the device that is above the impermeable structure, and thereby exposed to ambient conditions, from that part of the device that is below the impermeable structure, and therefore well protected.

Figure 7:
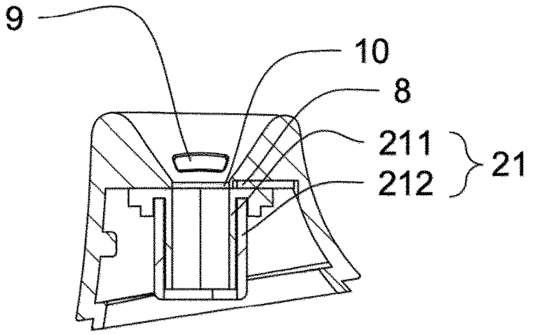
FIG. 7 is a cross-sectional view of a stimulation device that is separable into a top and bottom section in accordance with exemplary embodiments of the present disclosure.
Figure 7:
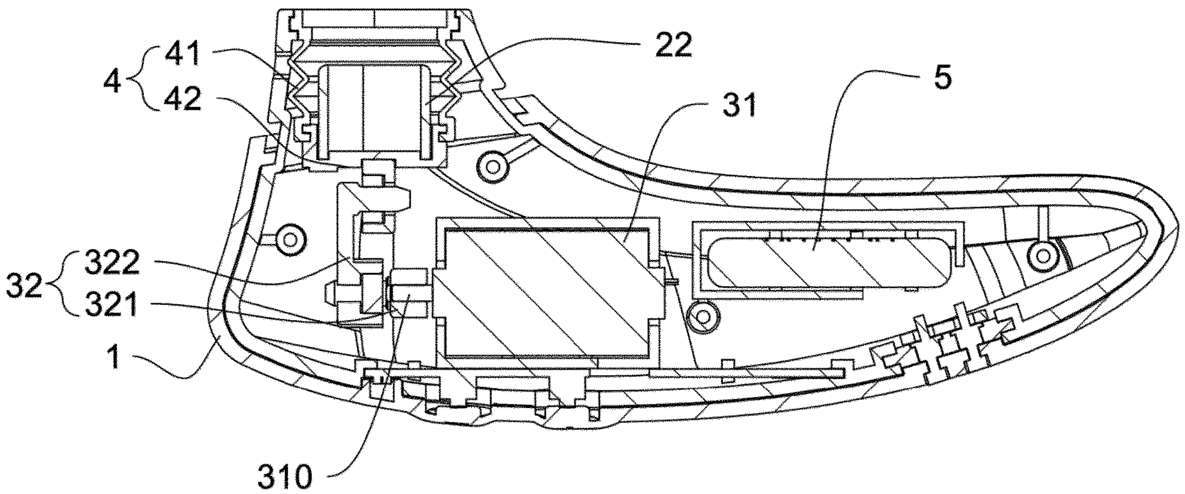

FIG. 7 is a cross-sectional view of a stimulation device that is separable into a top and bottom section in accordance with exemplary embodiments of the present disclosure.

This top section that is subject to exposure may include the hole 9, the opening 10, the sensor 8, the stationary sleeve 21 (including the cylindrical support 211 and the cylinder 212). The bottom section that is protected from exposure may include the motional container 22 and the impermeable structure 4 (including the bellows 41 and the bottom wall 42). The top and bottom sections may come together with a friction/pressure fitting, for example, to snap together, and/or may utilize various magnets to hold the two sections together while in use and to allow for quick detachment and reattachment, after use, when being cleaned.

Figure 8:
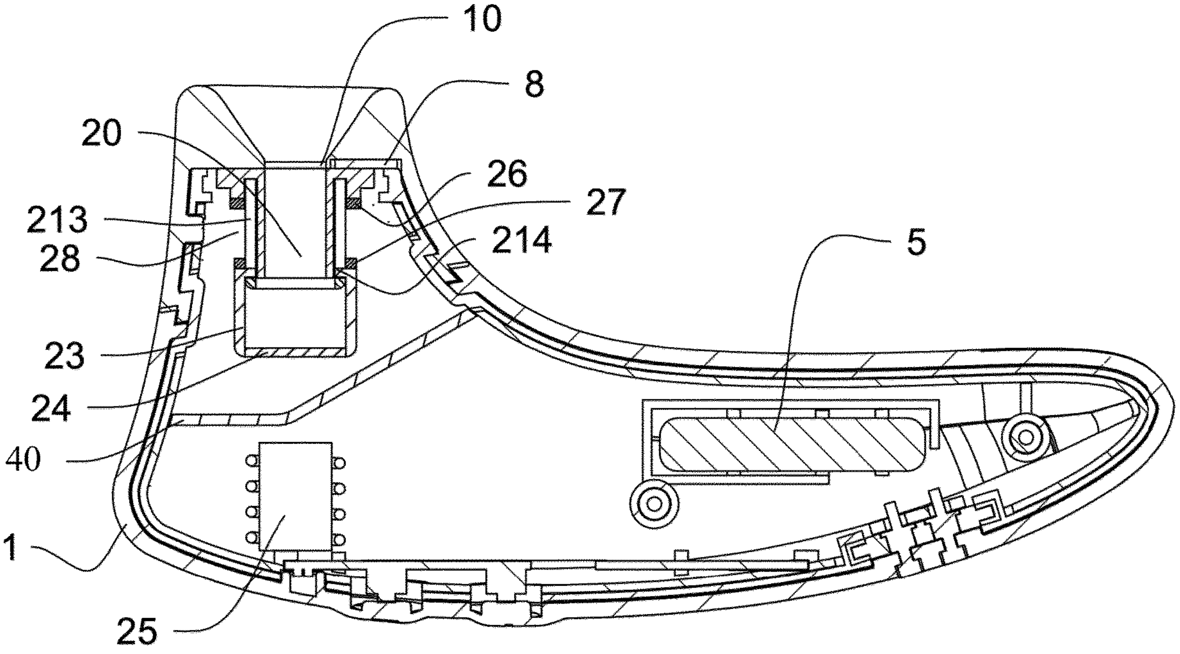
FIG. 8 is a cross-sectional view of a stimulation device utilizing magnetic means of implementing reciprocating motion in accordance with exemplary embodiments of the present disclosure.

The stimulation device need not rely upon a motor for the generation of pressure and various other arrangements may be designed. For example, the reciprocating motion of the motional container 22 may be implemented magnetically. FIG. 8 is a cross-sectional view of a stimulation device utilizing magnetic means of implementing reciprocating motion in accordance with exemplary embodiments of the present disclosure. As can be seen from this arrangement, rather than a motor, the housing 1 may include an electromagnetic coil 25 that may operate as an electromagnet under the control of the aforementioned controller and powered by the power source 5. When energized, the electromagnetic coil 25 may generate a magnetic field that repels a magnetic block 24 that is installed on a bottom of the motion sleeve 23 thereby forcing the motion sleeve 23 upwardly along a guide groove 213 that operates as a stationary sleeve 21 so as to reduce the volume of the chamber 20 and to generate positive pressure through the opening 10. This forcing of the magnetic sleeve 23 upwardly may overcome a downward bias imparted by a first magnetic ring 26 disposed on the guide groove 213 and the second magnetic ring 27 that is incorporated into the motion sleeve 23. A key 214 may be formed by a lateral protrusion on a top of the motion sleeve so as to prevent the motion sleeve 23 from detaching from the guide groove 213 when the electromagnetic coil 25 is de-energized.

When de-energized, the electromagnetic coil 25 may cease operating as an electromagnet and may discontinue its repulsive force against the magnetic block 24. The motion sleeve 23 may now be free to restore to its original lower position by the magnetic repulsion of the first magnetic ring 26 and the second magnetic ring 27.

As an alternative to de-energizing the electromagnetic coil 25, electric current therethrough may be reversed so as to attract the magnetic block 24 and assist in the expansion of the volume of the chamber 20.

One or more springs 28 may also/alternatively be used to create the restoring force that draws the motion sleeve 23 down.

The aforementioned magnetic polarities may be reversed so as to create an attractive bias between the first magnetic ring 26 and the second magnetic ring 27 and in this case, the electromagnetic coil 25 may attract the magnetic block 24 during energizing.

In either event, the magnetic block 24, at its lowest level, may be separated from the electromagnetic coil 25 by an impermeable structure 40, that may be a singular component, such as a seal, that need not be flexible as it need not move. Alternatively, the impermeable structure 40 may indeed be flexible as it may be pressed down by the magnetic block 24 in its lowest position.

Figure 9:
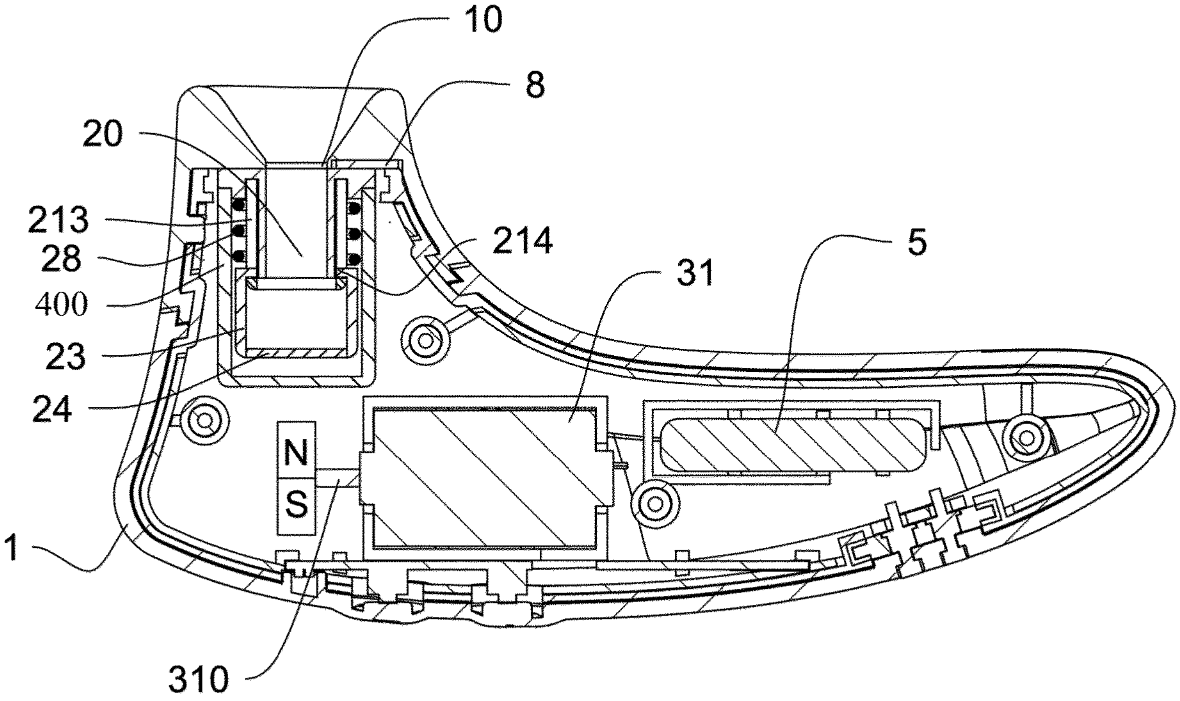
FIG. 9 is a cross-sectional view of a stimulation device, in accordance with exemplary embodiments of the present invention, that combines an electromagnetic means of creating the reciprocating motion of the motion sleeve with the use of a motor so as to provide an alternative means of generating pressure.

FIG. 9 is a cross-sectional view of a stimulation device, in accordance with exemplary embodiments of the present invention, that combines an electromagnetic means of creating the reciprocating motion of the motion sleeve 23 with the use of a motor 31 so as to provide an alternative means of generating pressure. According to this approach, a bar magnet may be disposed on the distal end of the output shaft 310 of the motor 31 so as to spin the bar magnet at a desired rate. The spinning of the bar magnet may create an alternating attraction and repulsion with the magnetic block 24 of the motional container 22 that pumps the motion sleeve 23 up and down so as to contract and expand the volume of the chamber 20 and generate the pressure. In this example, the one or more springs 28, in combination with or instead of the first magnetic ring 26 and the second magnetic ring 27, may again be used to help restorative force. In this approach, the impermeable structure 400 may also be a singular component here being disposed just beyond the magnetic block 24 at its lowest position. Other elements, while not shown in this figure, may be the same as in the other figures, including the hole 9 that may be in communication with the cavity between the magnetic block 24 and the impermeable structure 400.

Figure 10:
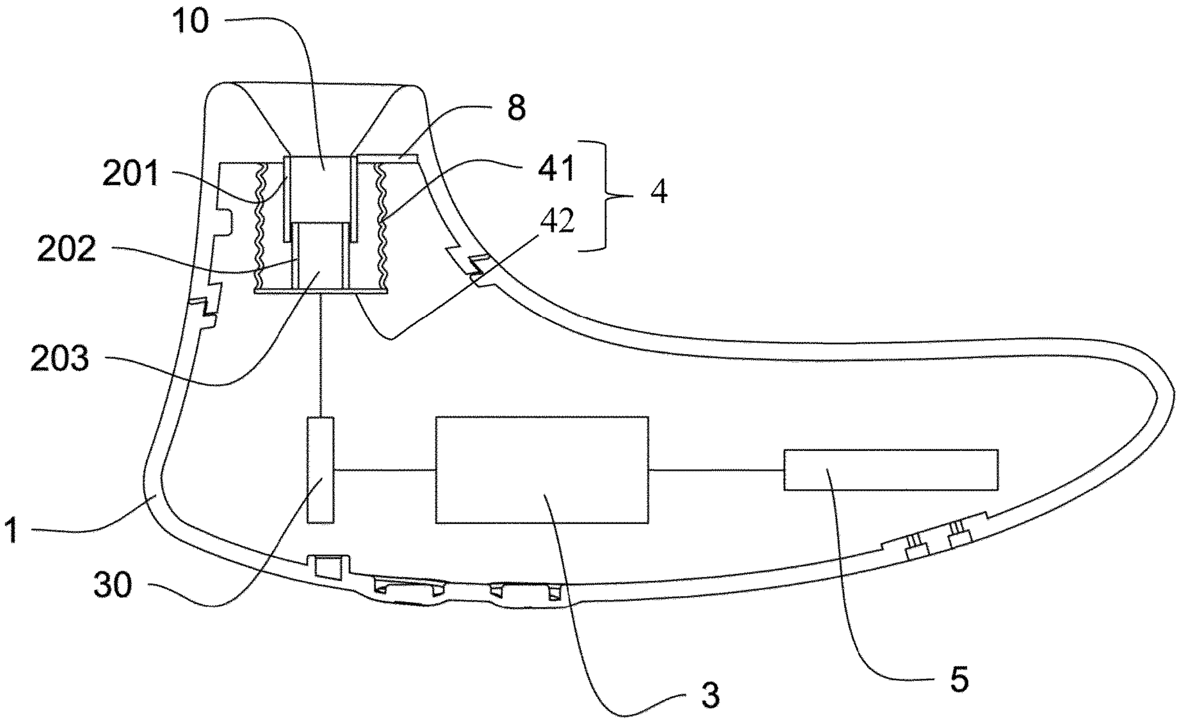
FIG. 10 is a cross-sectional view illustrating a stimulation device including an air cylinder that includes a stationary cylinder that is on the outside of a concentric piston having a concave cavity.

The examples described above featured the motional container 22 disposed outside of the concentric stationary sleeve 21. However, exemplary embodiments of the present invention need not have this configuration. For example, FIG. 10 is a cross-sectional view illustrating a stimulation device including an air cylinder 2 that includes a stationary cylinder 201 that is on the outside of a concentric piston 202 having a concave cavity 203. According to this approach, the power source 5 powers a drive mechanism 3 (such as a motor) so as to create a driving motion. A power output unit 30 (such as a reciprocating screw, a magnetic mechanism described above, or some other arrangement) transfers the driving motion of the drive mechanism 3 into a reciprocating motion so as to push a bottom wall 42 of an impermeable structure 4 into the piston 202 so as to move the piston 202 into the cylinder 201 and create a constricted volume that generates positive pressure. The power output unit 30 then reverses its motion so as to pull the bottom wall 42 of the impermeable structure 4 downwardly to create an expansive volume that generates a negative pressure. The pressure filed generator 2 thereby creates an alternating positive and negative pressure for the stimulation of the user.

The bottom wall 42 is connected to bellows 41 that are accordion shape so as to fold as the bottom wall 42 is in its upward position and to unfurl as the bottom wall is in its downward position.

Figure 11:
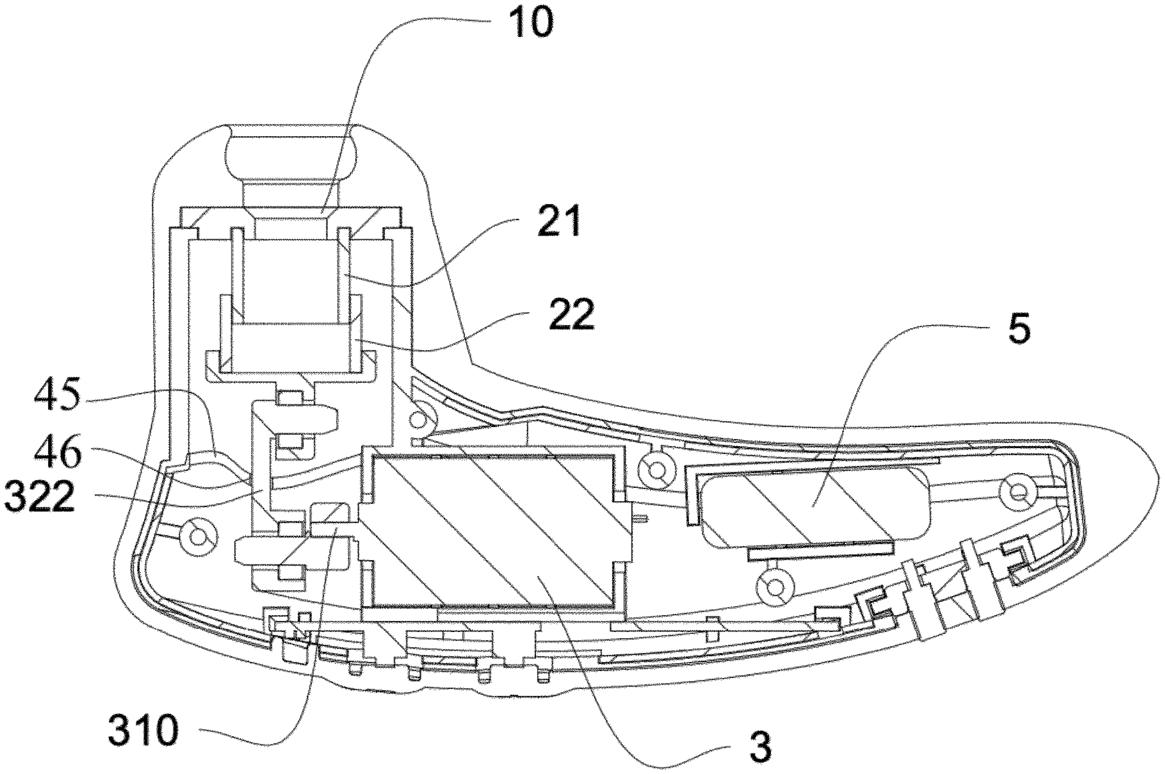
FIG. 11 is a cross-sectional view illustrating a stimulation device, similar to that illustrated in FIG. 2, but having an impermeable structure that includes a flexible partition spanning a width of the device, in accordance with exemplary embodiments of the present invention.

Even where the air cylinder 2 includes a stationary sleeve 21 and a motional container 22 that is pumped into and out of the stationary sleeve 21 to generate intermittent pressure, the impermeable structure need not be disposed around the air cylinder, as shown in FIG. 2. FIG. 11 is a cross-sectional view illustrating a stimulation device, similar to that illustrated in FIG. 2, but having an impermeable structure that includes a flexible partition 45 spanning a width of the device. The flexible partition 45 has an opening though which the connecting rod 322 of the motion converter 32 runs. The impermeable structure further includes a seal 46 that maintains waterproofing of the impermeable structure in the opening of the flexible partition 45. This seal 46 may be made out of a synthetic rubber and may include an elastic disk that includes one or more bellows for maintaining a tight seal even as the connection rod 322 moves about.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A stimulation device, comprising:

an exterior housing including an opening;

a power source disposed within the exterior housing;

a motor disposed within the exterior housing and receiving power from the power source to generate a spinning motion;

a crank and connection rod transforming the spinning motion from the motor into a reciprocating motion;

an air cylinder configured to receive the reciprocating motion from the crank and connection rod and expand and contract a volume of a chamber therefrom, the chamber delivering positive and negative pressure to the opening of the exterior housing as the chamber volume contracts and expands, respectively; and an impermeable bellows separating the air cylinder from the motor and power source, within the exterior housing, wherein the impermeable bellows surrounds an entirety of lateral surfaces of the air cylinder.

2. The stimulation device of claim 1, wherein the air cylinder includes:

a stationary member sleeve;

a motional container or a piston configured to reciprocate with respect to the stationary sleeve; and wherein the chamber is defined by at least an inside of the stationary member sleeve.

3. The stimulation device of claim 2, wherein the stationary sleeve is stationary with respect to the exterior housing; and wherein the motional container or the piston comprises the motional container configured to move up and down about the stationary sleeve, which is concentric thereto, the moving up reducing the volume of the chamber and the moving down enlarging the volume of the chamber, wherein the opening of the exterior housing is disposed at a top of the chamber, the opening delivering positive pressure therethrough when the volume of the chamber is reducing and delivering negative pressure therethrough when the volume of the chamber is enlarging.

4. The stimulation device of claim 2, wherein the stationary sleeve is a stationary sleeve that is stationary with respect to the exterior housing; and wherein the motional container or the piston comprises the piston configured to move up and down inside the stationary sleeve, which is concentric thereto, the moving up reducing the volume of the chamber and the moving down enlarging the volume of the chamber, wherein the opening of the exterior housing is disposed at a top of the chamber, the opening delivering positive pressure therethrough when the volume of the chamber is reducing and delivering negative pressure therethrough when the volume of the chamber is enlarging.

5. The stimulation device of claim 3, wherein the impermeable structure bellows includes:

a bottom wall that is coupled to the motional container or h piston; and a bellowed sidewall that is connected to the bottom wall, wherein the bellowed sidewall is configured to fold up as the volume of the chamber is contracting and to unfurl as the volume of the chamber is expanding.

6. The stimulation device of claim 1, wherein the impermeable bellows includes:

a flexible partition spanning a width of an interior of the exterior housing and having an opening through which the crank and connection rod penetrates; and a seal that maintains a waterproof connection between the flexible partition and the crank and connection rod.

7. The stimulation device of claim 1, wherein the opening of the exterior of the housing is disposed at a top of the chamber, the opening delivering positive pressure therethrough when volume of the chamber is expanding and delivering negative pressure therethrough when the volume of the chamber is contracting.

8. The stimulation device of claim 7, further including one or more holes in the exterior housing that communicate with a gap defined by an outside of the air cylinder and an inside of the impermeable bellows, and wherein the gap contracts as the volume of the chamber of the air cylinder contracts and enlarges as the volume of the chamber of the air cylinder expands.

9. The stimulation device of claim 7, wherein the one or more holes are sealed with a sealing plug.

10. The stimulation device of claim 1, wherein the exterior housing is separable into a top section and a bottom section with the top section including the air cylinder and the bottom section including the power source, the motor, the crank and connection rod, and the impermeable bellows.

11. The stimulation device of claim 10, wherein the top section and the bottom section are attached to one another using magnets and/or a friction/pressure fitting.

12. A stimulation device, comprising:

an exterior housing including an opening;

a power source disposed within the exterior housing;

an electromagnetic coil disposed within the exterior housing and receiving power from the power source to generate an intermittent magnetic field;

an air cylinder configured to expand and contract a volume of a chamber thereof by the intermittent magnetic field of the electromagnetic coil, the chamber delivering an alternating positive and negative pressure to the opening of the exterior housing as the chamber volume contracts and expands, respectively;

a stationary sleeve that is stationary with respect to the exterior housing; and a motional container or a piston configured to glide up and down along lateral surfaces of the stationary sleeve, which is concentric thereto, the moving up reducing the volume of the chamber and the moving down enlarging the volume of the chamber, and an impermeable partition separating the air cylinder from the electromagnetic coil, within the exterior housing, the impermeable partition directly contacting the motional container or piston.

13. The stimulation device of claim 12, wherein the opening of the exterior housing is disposed at a top of the chamber, the opening of the exterior housing delivering positive pressure therethrough when the volume of the chamber is reducing and delivering negative pressure therethrough when the volume of the chamber is enlarging.

14. The stimulation device of claim 13, wherein a magnetic block is disposed on a bottom surface of the motional container or the piston so as to move the motional container or piston up and down by a magnetic field of the electromagnetic coil.

15. The stimulation device of claim 13, wherein a bias of the motional container or the piston is maintained by a spring or a pair of magnetic rings disposed therein.

16. The stimulation device of claim 12, wherein the impermeable partition spans a width of an interior of the exterior housing.

17. A stimulation device, comprising:

an exterior housing including an opening;

a power source disposed within the exterior housing;

a motor disposed within the exterior housing and receiving power from the power source to generate a spinning motion;

a crank and connection rod transforming the spinning motion from the motor into a reciprocation motion;

an air cylinder configured to expand and contract a volume of a chamber thereof in response to the alternating polarity of the spinning bar magnet, the chamber delivering an alternating positive and negative pressure to the opening of the exterior housing as the chamber volume contracts and expands, respectively;

a stationary sleeve that is stationary with respect to the exterior housing; and a motional container or a piston configured to glide up and down along lateral surfaces of the stationary sleeve, which is concentric thereto, by the alternating magnetic field of the spinning bar magnet acting upon a magnetic block disposed within the motional container or piston, the moving up of the motional container or piston reducing the volume of the chamber and the moving down of the motional container or piston enlarging the volume of the chamber, and a flexible partition separating the air cylinder from the motor, and power source, within the exterior housing, wherein the flexible partition spans a width of an interior of the exterior housing and has an opening through which the crank and connection rod penetrate, and wherein a seal maintains a waterproof connection between the flexible partition and the crank and connection rod.

18. The stimulation device of claim 17, wherein the opening of the exterior housing is disposed at a top of the chamber, the opening of the exterior housing delivering positive pressure therethrough when the volume of the chamber is reducing and delivering negative pressure therethrough when the volume of the chamber is enlarging.

19. The stimulation device of claim 17, wherein the impermeable partition spans a width of an interior of the exterior housing, wherein the impermeable partition has a substantially cylindrical shape that surrounds the air cylinder.

20. The stimulation device of claim 17, further including one or more holes in the exterior housing that communicates with a gap defined by an outside of the air cylinder and an inside of the impermeable partition, wherein the gap contracts as the volume of the chamber of the air cylinder contracts and enlarges as the volume of the chamber of the air cylinder expands.

* * * * *